Sept. 29, 1964 R. G. RUSSELL 3,150,946
METHOD AND APPARATUS FOR PRODUCTION OF GLASS FIBERS
Filed Dec. 30, 1960 2 Sheets-Sheet 1
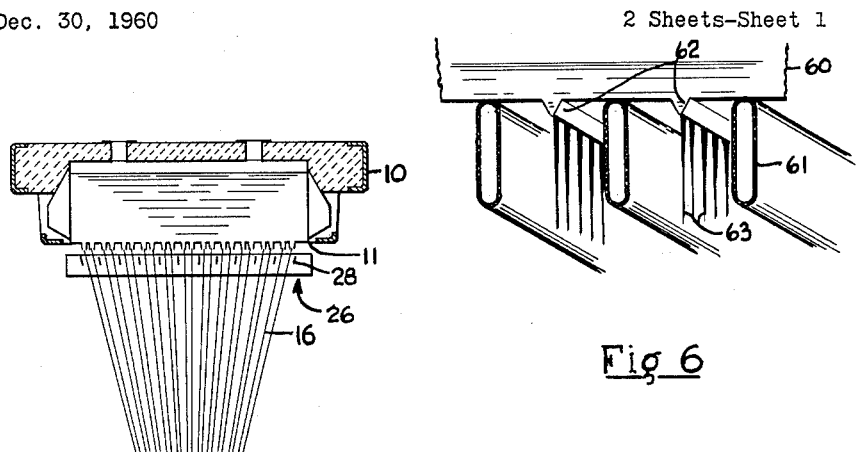
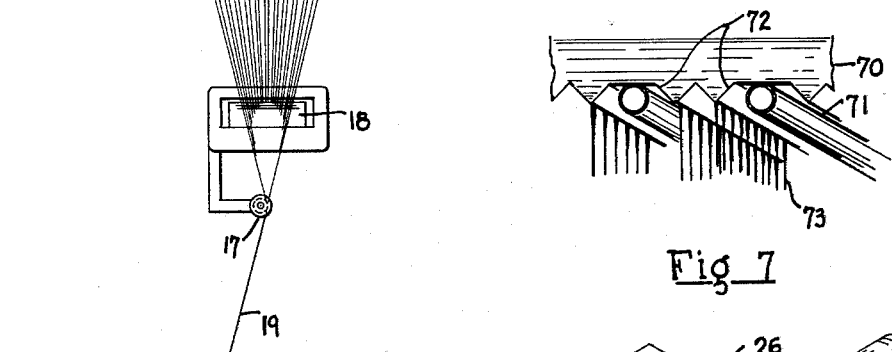
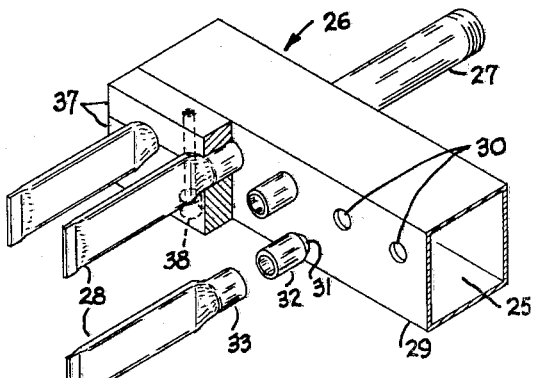
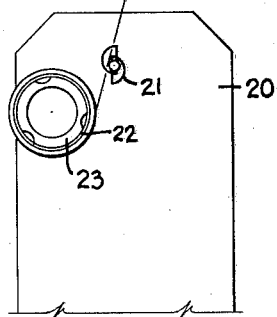
ROBERT G. RUSSELL
INVENTOR.
BY Staelin & Overman
ATTORNEYS

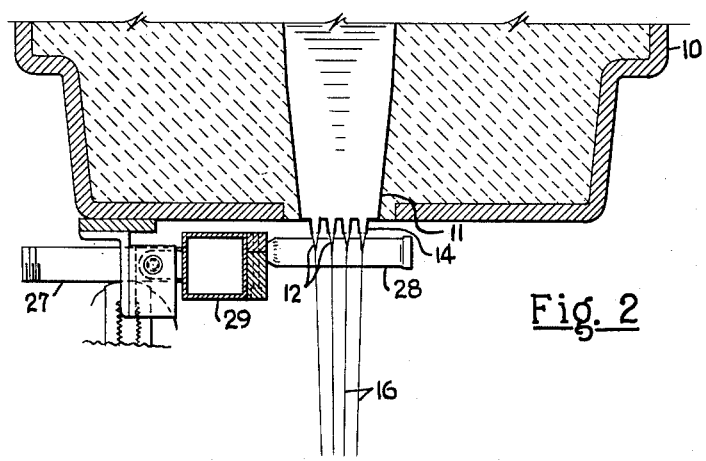
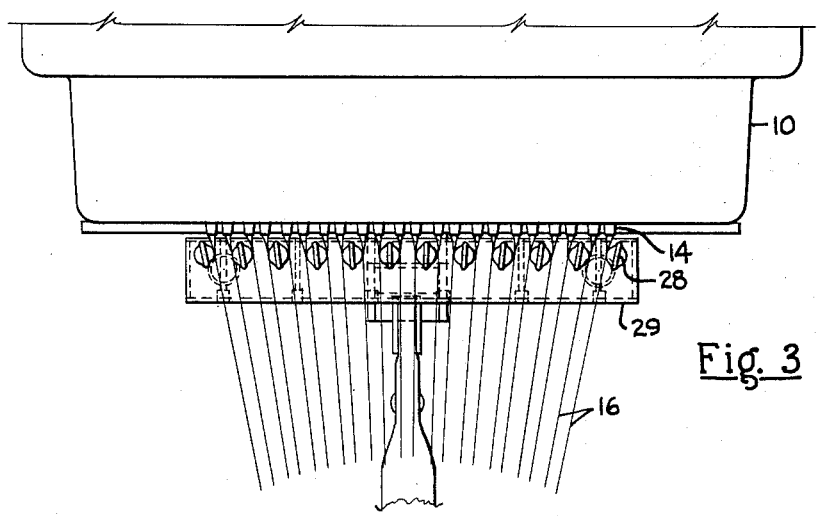
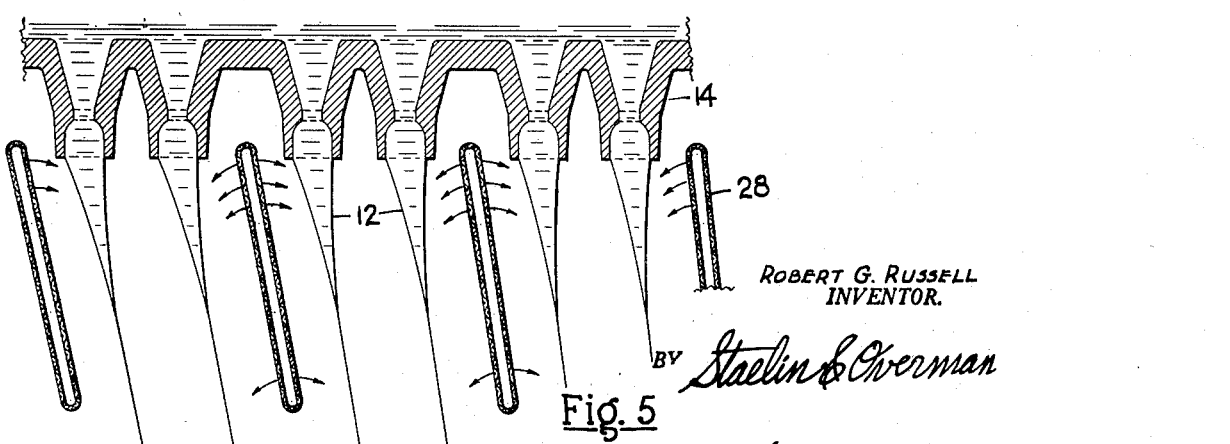
ROBERT G. RUSSELL
INVENTOR.
BY Staelin & Overman
ATTORNEYS United States Patent Office 3,150,946
Patented Sept. 29, 1964

1

3,150,946
METHOD AND APPARATUS FOR PRODUCTION OF GLASS FIBERS
Robert G. Russell, Granville, Ohio, assignor to Owens-Corning Fiberglas Corporation, a corporation of Delaware
Filed Dec. 30, 1960, Ser. No. 79,763
13 Claims. (Cl. 65—2)

This invention relates to improvements in the production of fibers from heat-softenable materials and particularly to a more stable, continuous method and apparatus for production of fibers of silicious material such as glass or the like.

The invention is herein exemplified by reference to the production of continuous glass fibers wherein streams of molten glass are attenuated mechanically into continuous fibers of small diameter and then grouped into a strand and wound into a package.

In greater detail, this process of producing continuous fibers of glass involves flowing streams of molten glass from orifices of an electrically heated bushing or feeder associated with a container reservoir in which the material is reduced to a molten condition. The orifices are usually formed in projecting tips or nipples from which heat of the glass is dissipated as it flows in the form of streams therefrom, but may also be formed in the apex of a V-shaped feeder or other structural arrangement such as a flat plate feeder made of a non-wetting alloy. Upon emission to the atmosphere the streams of the glass, each neck down, as determined by the viscosity and surface tension to form a cone-like body of the glass from the tip of which a fiber is drawn. The cohesive forces which transmit the attenuation force from the fiber to the body of the cone are closely related to the viscosity of the glass. Surface tension of the glass also contributes to the transfer of forces over the periphery of the cone, but, in addition, acts to bring about constriction of the stream into the conical configuration. As the temperature of the melt increases, the viscosity of the fluid from which the fiber is made is lowered and eventually reaches a point where it offers little resistance and the surface tension will actually constrict the material into beads or droplets instead of flowing as a continuous stream. A high viscosity in such fluid, on the other hand, offers higher resistance and slows the constricting forces to such an extent that the viscosity of the fluid is the major factor determining stability in the fiber-forming zone.

Taking these facts into consideration, it can be seen that if the viscosity of a given glass emitted from an orifice to a forming cone is too high, the tension required to be applied to the cool fibers to effect attenuation of the cone can be so high as to result in breakage of the fiber. At the more fluid end of the viscosity range, however, the glass flows more freely and the balance against surface tension becomes somewhat indefinite which causes a form of pumping action or dancing movement of the cones at the feeder tips. The further lowering of the viscosity of the glass results in an approach toward constriction by the surface tension to the extent that discontinuous separate droplets of the fluid are formed.

A range of viscosities therefore exists within which fiberization of the glass can be accomplished but above

2 and below which fibers are difficult or impossible to produce.

Apparatus has been introduced to the art by way of Patent 2,908,036 issued on October 13, 1959, in which water-cooled shield members are disclosed for disposition immediately adjacent the fiber-forming cones in non-contacting relation with the feeder to absorb heat from the cones by way of radiation absorption and to divide the total number of tips and their respective cones into smaller groups. The shield members shield the environment of the tips and the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could otherwise be fiberized with fluid emitted in an unshielded fiber forming zone. The fact that the melt can thereby be raised to a high temperature also permits production of fibers of greater uniformity and permits fiberization of glasses which previously were not fiberizable while at the same making operating conditions less critical to temperature variations due to turbulences in the surrounding atmosphere. By the provision of cooled shield members in the zone of fiber formation, the rate of cooling of the glass emitted from the feeder is not left to the variant conditions of the atmosphere but provides a greater control of the rate of cooling and makes the conditions of fiber formation more certain.

An additional feature which resulted from the adoption of shield members for fiber-forming operations was the increase in the number of rows of tips in a given feeder from which fibers could be attenuated. Previously the number of rows in a given feeder were limited to adjacent rows because if an additional third row were included in the feeder the center row would be so high in temperature from energy radiated to the center row of tips from the outside rows that the glass emitted therefrom would be so fluid as not to allow stable formation of fibers. With the presence of the shield members, however, the number of rows could be increased to many more and, at the present time, six and eight rows of tips in a given feeder have become somewhat of a standard in the art. The increased number of rows are highly desirable because the length of the feeder can be greatly reduced for a given number of fibers to be produced correspondingly reducing the amount of precious metal such as platinum which is usually used in glass fiber feeder constructions.

A difficulty was presented in the use of such shield constructions in association with glass fiber feeders in that in a matter of hours during periods of constant operation of fiber-forming units, volatile materials emitted by the molten glass were deposited over the shield member surfaces adjacent the cones so that after a period in the order of six to eight hours, the shield constructions were required to be cleaned in order to make them fully effective again. Accumulations of the volatile material on the surface of the shield members modified the rate of heat absorption from the forming cones to the extent that in some cases the stabilization desired was greatly reduced. Additionally this collection of volatile materials built up to the extent that the space available for passage of fiber cones between adjacent shields was inadequate for free movement therethrough. Accordingly, the conditions of fiber formation were undesirably changed to the point where cleaning operations were necessitated.

The accumulation of extraneous material on the shield member is not fully understood, but it appears fairly certain that the material accumulated is a volatile of the glass composition, but it also appears possible that some of the matter may be deposited by the induced air which is passed through the forming zone. Regardless of the source, however, the material must be removed periodically and in a conventional shield member the time required for cleaning is in the order of eight to fifteen minutes per fiber-forming unit every six to eight hours. This loss of time in the production unit is extremely costly especially in view of the fact that such units produce fibers at rates in the order of 15,000 feet per minute which means that up to 300,000 yards of strand production are lost every twenty-four hours of operation for each fiber-forming unit due to the need for cleaning of the shield members. The number of fiber-forming units in operation in the United States using shield members is numbered in the 1000's and accordingly the need for cleaning of shield members for such units results in an enormous loss in production in every producing day. In view of the foregoing, it is an object of the present invention to provide a more efficient, more economically operable shield structure for fiber-forming operations wherein fibers are attenuated from thermoplastic materials supplied from orificed feeders.

It is another object of the present invention to provide a method and means for the production of continuous fibers of glass wherein shield members are utilized for stabilization of the fiber-forming operation, which shield members are substantially free of the need for periodic cleaning.

Additionally, it is an object of the present invention to provide a more efficient method and means for shielding and absorbing heat from the immediate fiber-forming zone in the production of continuous fibers of thermoplastic materials.

A still further object of the invention is to provide a cooling shield which is adjustable in its rate of heat absorption from the immediate fiber-forming zone to permit establishment of an optimum of heat absorption for a particular set of conditions available.

Another and still further object of the invention is to provide a cooling shield arrangement for the production of fibers which is effective to absorb more heat than has been heretofore possible with such units and to effect such absorption in a manner which permits stable production of fibers of materials requiring high temperature melting conditions in ranges beyond that in which fibers could previously be produced.

In brief, the present invention accomplishes these objectives by providing a shield structure for fiber-forming units wherein the cooled surfaces adjacent each fiber-forming cone are pervious, or in other words, gas permeable and are retained in cooled condition by passage of air therethrough, the air being effective both to provide the cooling for the heat absorption desired and at the same time being effective to clean the members by conveying away particles which might otherwise tend to deposit upon the surface.

In operation, the passage of air through the shield members adjacent their fiber-forming cones is highly efficient in effecting heat absorption from such cones because the fresh air flow about the cones causes absorption of heat therefrom by way of convection in addition to the radiation absorption effected by the surface of the shields. In other words, beside removal of heat from the cones by radiation absorption, heat is also carried away by convection transfer. Although air is herein described as the gas used to effect cleaning and cooling of the pervious shield members, it will be recognized that other gases can also be used for such purposes. For example, gases like nitrogen, argon and crypton, and in some cases even steam can be used to effect cleaning of the shield members and cooling of the hot glass of the cones.

An incidental, unexpected feature which has resulted from this invention and which has proven extremely valuable is the additional factor of fiber dimension control which such air shield structures have provided in the fiber-forming operation. It has been found that by regulating the pressure and amount of air passed through the fins into the fiber-forming zones, the amount of glass emitted from the feeder and the diameter of the fibers being actuated can be modified for an otherwise given set of feeder operating conditions. By increasing the pressure and correspondingly the amount of air emitted from the pervious shield members, the rate of absorption of heat from the fiber-forming cones can be controllably modified to the extent that the supply of glass emitted from the feeder orifices will change to permit a fine adjustment for diameter of the filaments independent of the diameter otherwise fixed by the feeder controls. Thus, the air shields can be made to regulate the final dimension of the fibers in addition to being self-cleaning and being more effective as heat absorbing units.

Still another feature of the invention lies in the greater stability provided by controlled cooling of the immediate zone of emission of the glass from the feeder tips over and above that provided by radiation absorption by the cooled surfaces adjacent the forming cones. With such additional cooling, particularly at the widest portion of the forming cone where the glass has its greatest fluidity, the tension established in the filaments being formed, and the stability of the cones can be more positively regulated.

A further feature of the invention lies in the fact that the induced air which normally flows through the fiber-forming zone can be reduced and even eliminated if desired for certain conditions of production. For example, by passage of the clean air into fiber-forming zone from the shield members, the amount of air which can be induced therein by reason of movement of the filaments in the forming environment can be reduced by reason of the forming zone being filled with clean air. Since this clean air is introduced into the fiber-forming zone under controlled pressure, conditions determining the immediate atmospheric environment can also be retained more steady and less affected by extraneous air transients or eddys that might arise in the surrounding atmosphere.

Other objects and features which are believed to be characteristic in my invention are set forth with particularity in the appended claims. My invention, however, both in organization and manner of construction and operation together with further objects and advantages may be best understood by reference to the following description taken in connection with the accompanying drawing in which:

FIGURE 1 is a view of a general layout of apparatus including air shielding components for the production of continuous glass fibers in accordance with the principles of the present invention;

FIGURE 2 is an enlarged side elevational view partly in cross section of the glass feeder and associated shield construction shown in FIGURE 1;

FIGURE 3 is an enlarged view of the fiber-forming zone for the apparatus arrangement shown in FIGURE 1;

FIGURE 4 is a perspective view partly in cross section of an air shield structure adapted to incorporation with a fiber-forming feeder in accordance with the principles of the present invention;

FIGURE 5 is a pictorial illustration partly in cross section showing the disposition and general orientation of the air shield elements in the immediate vicinity of the orificed tips and fiber-forming cones emitted therefrom;

FIGURE 6 is a perspective view partly in cross section of another fiber-forming feeder construction of the invention wherein air shield members are structurally integrated with the bottom of the feeder;

FIGURE 7 is a persepective view of still another feeder construction of the invention somewhat like that of FIGURE 6 in which the air fins are integrally associated with the bottom of the feeder as a structural portion thereof.

Referring now more particularly to the drawings, FIGURE 1 illustrates a refractory furnace 10 for reducing a body of glass to a molten condition having a bushing or feeder 11 associated therewith from which a plurality of streams of glass are emitted from orifices in the feeder for attenuation into fibers 16. The fibers are gathered into a strand by drawing them over a gathering member 17 while sizing fluid is applied to the fibers by a roll type applicator 18 which supplies a sizing to each filament above the point of collection at the gathering member 17. The strand 19 formed of the gathered fibers is packaged by a winder 20 which collects the strand on a tube 22 mounted on a rotating collet 23 and traversed by a suitable traversing device such as a spiral wire traverse 21. The winder provides the force of attenuation for the fibers by reason of rotation of the collet which develops tension in each fiber to withdraw from the molten glass flowing from the feeder.

The shield unit 26 of the present invention provides a plurality of heat removing members in the form of porous, hollow blade-like fins 28 each extending across the bottom of the feeder between a pair of rows of feeder tips 14, while each adjacent pair of such fin members has one or two rows of tips aligned therebetween. The orientation of the pervious or permeable blade-like fins 28 across the under part of the feeder, with feeder tips aligned therebetween may be seen more clearly in FIGURES 2 and 3 which illustrate that the tips 14 and the cones 12 emitted therefrom are, in effect, divided into crosswise pairs of rows.

The pervious fins 28 extend from a longitudinal hollow air header 29 disposed laterally with respect to the feeder structure. Air is supplied to this header by way of a conduit 27 connected centrally to the back side of the header. The air under pressure passes through the header and then from each of the pervious blade-like shield members 28 immediately into the fiber-forming zone. The blade-like members 28 are pervious over their full length within the fiber-forming zone so that air introduced to one end thereof is passed through the hollow interior portion and passes out from the surfaces of the fins immediately in the fiber-forming zone.

The height of the fins 28 is preferably such that when in operating position the upper edge of each is at a level slightly above the bottom of the feeder tips with which it is associated, while its bottom edge extends downwardly at least to the level of the apex of the cones emitted from the orifices in the tips 14. In this respect, the fins may extend about $\frac{1}{32}$ of an inch above the bottom edges of the tips of the feeders. With such positioning of the upper edge of the fins, the height of the shields necessary to provide full shielding of the cones in some instances may only be in the order of $\frac{3}{8}$ of an inch. The disposition and orientation of the shields with respect to the tips may be seen more clearly in FIGURE 5.

FIGURE 4 illustrates more in detail the structural components of the air shield unit 26 showing how the previous fin or blade-like members 28 are assembled and mounted on the header member 29. The header 29 is a hollow bar with solid walls into the interior 25 of which air under pressure is introduced from the conduit 27 connected with a suitable air supply. The ends of the header 29 are closed, but outlet apertures 30 are provided in one longitudinal side in which tubular inserts 31 are set, such as by threadably engaging them in the apertures 30 or welding them into position thereover.

Tubular mounting collars 32 are then snugly associated or fixedly joined to the tubular inserts 30. The mounting collars are each dimensioned for a snug fit association with the neck portion 33 of a longitudinal pervious fin member 28. The tubular mounting collars 32 are preferably circular in cross section and the necks 33 of the blades 28 are correspondingly preferably circular so that upon mounting the fins on the collars 32, they can be angularly adjusted to match the general orientation of the fins to the path of the filaments passing on either side thereof from the feeder to the gathering member 17. When the blades 28 are each mounted in position on the collars 32, they can be fixedly secured in desired angular position by a pair of mated clamping bars 37, oppositely disposed and secured by clamping bolts 38 to engage the tops and bottoms of the neck portions 33 of the fins.

The fins or blades 28 can each be made of commercially available woven stainless steel tubular material of circular cross-section. The woven stainless steel mesh can be cut to desired lengths, whereupon the vertical dimension can be imparted thereto by squeezing it into flattened shape while still retaining a hollow interior and an open circular end to form a mounting neck portion. The flattened end of each of the blades is then welded closed. A particular feature of the arrangement illustrated here, however, is that the longitudinal fins are easily adjustable in angular orientation with respect to the paths of the filaments and then easily clamped solid in their angular position for association with any number of arrangement of feeders from which fibers are drawn.

By way of example, the perviousness of the metal mesh may be in the order of 30%. This can be obtained from a blade member made of commercially available stainless steel mesh having 1400 apertures per inch. Another straight forward method for making such fins is to fold a sheet of metal mesh material, either one or two plys thick, over a blade-like mandrel and to weld an edge and an end thereof according to the shape and dimension desired, while the other end is retained open to match the outlets to which the member is to be affixed.

The shield structure can be connected to an air supply line having a pressure in the order of 60 pounds per inch sq. which is preferably reduced to a value equivalent to 12 inches of water for direct use by the shield structure. Under such conditions, the amount of air consumed for a structure similar to that shown in FIGURES 1 to 5, is in the order of 250 to 500 cubic feet per hour.

As shown in FIGURE 5, the air emitted from the pervious shield members flows downwardly in the direction of movement ofthe cones and causes a convection transfer of heat from the filaments 16. At the point of emission of the glass from the orificed tips 14, the forming cones 12 have their greatest volume and temperature, but as the glass moves downwardly, the cone dimension and temperature is considerably reduced. Thus, removal of heat by radiation absorption from the cones 12 is most effective in the immediate zone of emission from the tips 14, while convection transfer is the more effective mechanism for heat removal in the region of the apices of the forming cones where the glass is at a lower temperature. Cooperatively, the velocity of the glass in each cone is gradually increased from the point of emission from the tips 14 to the apices of the cones being attenuated into fibers. Correspondingly, the air emitted from the fin members 28 accumulates in the direction of movement of the cones for their entire length down to the point of their formation into the fibers 16. Thus, more air flows cooperatively past the tips of the cones to cause increased convection removal of heat in the zone where such convection transfer of heat from the glass rather than radiation absorption by the fins is most effective and important. In view of these facts, it is apparent that the supply of air from the fins extends the effectiveness of the shield members in absorbing heat from the cones, and the stability of the forming cones is correspondingly subjected to greater control.

The amount of air supplied to the fiber-forming zone can be made sufficient that the induced air flow over the tops of the shield members is negligible, but this can be reduced if desired for special conditions so that induced air will flow into the zone.

As indicated above, it has been found that this arrangement will allow an additional degree of control over the fiber diameter. With an increase in air flow through the shield members, the diameter of the fibers can be reduced to some degree when the feeder tips are subjected to the influence of the cooling air along with the cones. When, however, the feeder tips are maintained fixed in temperature such as by setting and regulating them with an automatic temperature control governed by a temperature sensing element in the immediate vicinity of the feeder tips, then additional air will cause only the forming cones to become cooler which results in the fiber diameter being increased. Thus, when all other factors of control are set, the amount of air flow through the shield members and into the fiber-forming zone can be used as vernier-like adjustment for the exact desired diameter. By way of example, such control can be exercised over a plus or minus 4% or more from a given diameter fixed by automatic temperature controls.

Since the shield structure so provided is more effective in absorbing heat from the fiber-forming cones, the feeder can be raised to a higher temperature than the usually normal without disrupting fiber-forming apertures, and in doing so, devitrification of the glass in the melt can be avoided for many compositions which would otherwise be difficult to fiberize. In so avoiding devitrification of the melt, the ease of flow of the fluid into the forming zone is also promoted without disruption difficulty from extraneous inclusions.

FIGURE 6 illustrates another air shield arrangement wherein air is supplied from pervious members 60 which are integrally adjoined to the bottom of the feeder 61 so that the shield members structurally reinforce the feeder. By making these members part of the feeder, the amount of precious metal required to construct the feeder is reduced considerably because of the added strength against feeder sag provided by the shield members themselves. It has been found that when air is passed through the pervious shield members, it can be maintained cool without fear of heat being transferred by conduction from the feeder in sufficient quantities to cause any concern for the structural weakness of the shield members themselves or the feeder which they reinforce. When, however, the temperature of the feeder is at a high red heat or more, it is a necessity that the air be flowing through the shield members in order to maintain structural stability. Upon the air flow being excessively reduced or shut off, the shield members themselves build up in temperature due to heat conduction from the feeder bottom which causes them to melt down relatively rapidly. This condition does not occur, however, when the air is caused to flow constantly from the shield members under the usual operating conditions.

By resort to such a shield arrangement wherein the shield members extend up above the glass cones, it has been found that the individual tips for each of the orifices from which the glass is emitted can be eliminated and that the orifices instead can be formed in a V-shaped or trough-like channel 62 projecting from the bottom of the feeder. Since each orifice under these conditions, does not need an individual tip projection from the bottom of the feeder, the orifices can be placed closer to each other along the length of the grooves 62. This promotes reduction in the length of the feeder and reduces the over-all consumption of the costly precious metal in the construction of the feeder. The spacing between adjacent troughs or V-grooves 62 can be made as close as that of between adjacent rows of tips of the previous forms of the invention and each row of orifices can be provided with a pair of shield members on opposite sides. Alternately, a pair of rows of orifices for the emission of glass can be located between each pair of porous shield members 61. In each instance, the zone immediately under the feeder is sectionalized to reduce the effect of the atmospheric disturbances and at the same time, provide a cooling action by way of radiation absorption and convection transfer of heat dissipated from the cones of glass from which the fibers 63 are attenuated.

The vertical dimension of the shield members 61 is sufficient to extend to the bottom of the cones emitted from the feeder orifices, extending from their point of joinder with the bottom of the feeder 60. Any induced air that might be present in the fiber-forming zone, thus must flow from the shield members, and this can be minimized or eliminated by reason of introduction of clean air.

FIGURE 7 shows another form of shield structure wherein the porous shield members themselves are primarily present to supply air in the fiber-forming zone from a point above the point of emission of the glass from the feeder orifices. The feeder 71, in this instance, has the pervious air supply shield members 71 located on the opposite side of each row of orifices in a V-shaped channel projecting from the feeder or, as illustrated, on opposite sides of each adjacent pair of rows of orifices from which glass is emitted. The members are integrally joined to the bottom of the feeder in the manner similar to FIGURE 6, thus reinforcing the bottom and entire form of the feeder structure and reducing the amount of precious metal required for the feeder. The air is directed generally horizontally toward the V-shaped channel in which the orifices are formed and diagonally toward the zone of emission of the glass in the form of cones from the orifices. In this instance, the members need not extend appreciably below the zone of emission of the glass from the orifices and thus is primarily effective in removing heat from cones by convection transfer since a minimum of shielding is located immediately adjacent the forming cones. The V-shaped portion of the feeder is also cooled by the air flow thereover, thus providing an additional degree of control over the glass by extending the cooling action, more positively up into the emission portion of the feeder. The glass from the feeder is maintained at a level determined by the current flow through the feeder upon approach to the V-shaped zone in which the orifices are located, but the immediate zone of emission of the glass is under localized temperature control in that the air from the feeders is regulated to lower the feeder temperature in the orificed zone, as well as the temperature of the glass emitted therefrom.

In the latter two embodiments, a principal feature lies in the structural reinforcement of the feeder by the presence of air shields and at the same time allowing the closer spacing of orifices to permit use of a smaller feeder for formation of a given number of filaments.

While I have herein shown and described particular embodiments of my invention, it will, of course, be understood that I do not wish to be limited thereto, since many modifications may be made, and I contemplate by the appended claims to cover all such modifications as fall within the true spirit and scope of the invention.

I claim:

1. Apparatus for producing filaments of heat-softenable material comprising a feeder for feeding such material in molten form having orifices from which streams of such material flow, means for continuously attenuating the streams to fine filaments in an attenuation zone immediately adjacent said feeder, a series of gas passages extending between said orifices subdividing the total number of said orifices into smaller groups, and gas supply means feeding gas to said passages, said passages each having pervious walls and being aligned for gentle release of gas into said zone of attenuation from points between said groups of orifices.

2. Apparatus for producing filaments of heat-softenable material comprising a feeder for feeding such material in molten form having orifices from which streams of such material flow, means for continuously attenuating the streams to fine filaments in an attenuation zone immediately adjacent said feeder, a series of longitudinal pervious walled gas passages extending in side-by-side relationship immediately adjacent said orifices subdividing the total number of said orifices, said passages also being aligned so that each of said orifices has at least one of said passages extending in immediately adjacent relationship therewith, and gas supply means feeding gas cooler than said streams to said passages, the perviousness and disposition of the walls of said passages being such as to diffuse the cool gas from the interior of said passages through said walls into said attenuation zone in locations between said streams.

3. Apparatus for producing filaments of heat-softenable material comprising a feeder for feeding such material in molten form having orifices from which streams of such material flow, means for continuously attenuating the streams to fine filaments in an attenuation zone immediately adjacent said feeder, said feeder orifices being arranged in a pattern made up of rows of said orifices, a series of hollow longitudinal gas permeable members extending in side-by-side relationship in said attenuation zone to subdivide the total number of streams emitted from said orifices into smaller groups within said zone, said members also being aligned so that each of the streams emitted from said rows of orifices has at least one of said members extending in immediately adjacent relationship therewith, and gas supply means feeding the cooling gas to the interior of said members, the permeability and orientation of said members being such as to allow diffusion of such gas from the interior of said members into said attenuation zone in locations between pairs of said streams to remove heat from said streams.

4. Apparatus for producing glass filaments comprising a feeder for feeding molten glass having projecting tips extending from an undersurface thereof, said tips being aligned in rows and each having an orifice provided therein from which a stream of glass is emitted, means for attenuating the streams in a given zone to fine filaments, said attenuating means acting on said streams in such a way as to impart in general a conical shape to each extending from its base at its respective orifice to an apex from which its respective filament is withdrawn, environmental control means associated with said feeder comprising gas pervious walled members arranged in side-by-side parallel relationship and aligned in the zone of attenuation of said streams so that each extends to a position adjacent at least one row of cones emerging from said tips, said members being arranged so that a maximum of two rows of cones reside between each pair of such members, and gas supply means providing a constant supply of gas diffused at low pressure from the pervious walls of said members into locations between pairs of said streams in said zone of attenuation of said streams.

5. Apparatus for producing filaments of heat-softenable material comprising a feeder for feeding such material in molten form having orifices from which streams of such material flow, means for continuously attenuating the streams to fine filaments in an attenuation zone adjacent said feeder, gas permeable radiant heat absorbing members extending into said attenuation zone between said streams subdividing the total number of streams emitted from said orifices into smaller groups, said members being aligned so that each of the streams emitted from said orifices has at least one of said members extending in adjacent radiant heat absorbing relationship therewith, and a source of cooling gas connected to said gas permeable members providing a constant supply of gas to said members, the gas permeability of said members being such that the cooling gas is diffused from said members into said attenuation zone and prevents substantial deposition of materials on said members as well as preventing excessive heating of said members.

6. The apparatus of claim 5 wherein the radiant heat absorbing members in said attenuation zone are so disposed in close adjacency with their respective streams that the streams of material are cooled by convection transfer of heat to the gas released from said members.

7. Apparatus for producing glass filaments comprising a feeder for feeding molten glass having projecting tips extending from an undersurface thereof, said tips being aligned in rows and each having an orifice provided therein from which a stream of glass is emitted, a means for attenuating the streams to fine filaments in a zone of attenuation adjacent said feeder, said attenuating means acting on said streams in such a way as to impart in general a conical shape to each extending from its base at its respective orifice to an apex from which its respective filament is withdrawn, environmental control means associated with said feeder comprising metal mesh gas pervious members arranged in side-by-side parallel relationship, and aligned so that each extends to a position adjacent at least one row of cones emerging from said tips, said members being arranged so that a maximum of two rows of cones reside between each pair of such members and at least one of said members extends between a pair of rows of cones, and gas supply means providing a sufficient constant supply of clean cooling air for diffusion from the gas pervious surfaces of members into said zone of attenuation to cool said streams while at the same time maintaining said members cool and preventing substantial deposition of volatile materials from said glass upon said members.

8. The apparatus of claim 7 wherein the general dimension of said gas pervious members extending in the direction of movement of said streams is of magnitude such that it extends at least from the general level of said orifices to the general level corresponding to the limit of said attenuating zone.

9. Apparatus for producing glass fibers comprising a feeder for feeding molten glass having parallel longitudinal projections in its glass emitting surface, orifices aligned in each of said projections for feeding molten glass in the form of streams for attenuation into fibers in a zone of attenuation immediately adjacent said longitudinal projections, longitudinal gas permeable members structurally integrated with said surface for reinforcement thereof and aligned so that each of said orifices has at least one of said members extending in immediately adjacent relationship therewith, at least one of said members being aligned in extended relation between an adjacent pair of said projections, and gas supply means feeding gas to said members, the permeability of said members being such that gas is diffused therefrom into engagement with the glass emitted from said orifices.

10. The apparatus of claim 9 wherein the general dimension of said gas permeable members extending in the direction of attenuation of said streams is of a magnitude such that it extends from said feeder at least to the general level corresponding to the limit of said zone of attenuation.

11. The apparatus of claim 9 wherein the said gas permeable members are generally circular in cross section with a diameter of general magnitude such that they extend from said feeder no further than partially into said zone of attenuation.

12. A method for producing filaments of heat-softenable material comprising feeding streams of a molten form of said material from a feeder, attenuating said streams into fibers, diffusing cooling gas into the zone of attenuation of said streams from locations between said streams, and controlling the diameter of said fibers to provide fibers of desired diameter by regulating the amount of cooling gas flowing into said zone.

13. A method for improving the stability of production of fibers of heat-softenable material comprising flowing and linearly attenuating a plurality of molten streams of such material at a rapid velocity from a feeder, and diffusing a uniform flow of clean gas into the zone of attenuation from locations between pairs of said streams to reduce flow of induced air into said zone from the surrounding atmosphere.

References Cited in the file of this patent

UNITED STATES PATENTS

| | | |
|---|---|---|
| 2,215,982 | Slayter et al. | Sept. 24, 1940 |
| 2,234,986 | Slayter et al. | Mar. 18, 1941 |
| 2,291,289 | Slayter et al. | July 28, 1942 |
| 2,335,135 | Staelin | Nov. 23, 1943 |
| 2,418,873 | Fletcher et al. | Apr. 15, 1947 |
| 2,634,553 | Russell | Apr. 14, 1953 |
| 2,706,365 | Stalego | Apr. 19, 1955 |
| 2,908,036 | Russell | Oct. 13, 1959 |
| 3,002,226 | Warthen | Oct. 3, 1961 |

FOREIGN PATENTS

| | | |
|---|---|---|
| 774,339 | Great Britain | May 8, 1957 |